(12) United States Patent
Yoshikawa et al.

(10) Patent No.: US 12,253,815 B2
(45) Date of Patent: Mar. 18, 2025

(54) ENDLESS BELT, FIXING BELT, FIXING DEVICE, AND IMAGE FORMING APPARATUS

(71) Applicant: FUJIFILM Business Innovation Corp., Tokyo (JP)

(72) Inventors: Ryohei Yoshikawa, Kanagawa (JP); Tomotake Inagaki, Kanagawa (JP); Kenji Kajiwara, Kanagawa (JP); Hiroaki Tanaka, Kanagawa (JP); Taiki Nagamatsu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/448,651

(22) Filed: Aug. 11, 2023

(65) Prior Publication Data
US 2024/0302775 A1  Sep. 12, 2024

(30) Foreign Application Priority Data

Mar. 7, 2023 (JP) ................. 2023-034955

(51) Int. Cl.
*G03G 15/20* (2006.01)
*B32B 27/08* (2006.01)
*B32B 27/28* (2006.01)

(52) U.S. Cl.
CPC ......... *G03G 15/2057* (2013.01); *B32B 27/08* (2013.01); *B32B 27/281* (2013.01)

(58) Field of Classification Search
CPC .. B32B 27/281; B32B 27/08; G03G 15/2057; G03G 15/2053; G03G 15/2064
See application file for complete search history.

(56) References Cited

U.S. PATENT DOCUMENTS

| | | | |
|---|---|---|---|
| 11,586,132 B2* | 2/2023 | Kojima | ................ G03G 15/162 |
| 2012/0128953 A1* | 5/2012 | Kuraoka | ................ B32B 27/20 |
| | | | 428/215 |
| 2014/0348559 A1* | 11/2014 | Miyahara | .................. B32B 7/00 |
| | | | 399/329 |

FOREIGN PATENT DOCUMENTS

| | | |
|---|---|---|
| JP | 9-328610 A | 12/1997 |
| JP | 2006-259712 A | 9/2006 |
| JP | 4911674 B2 | 4/2012 |
| JP | 2013-189625 A | 9/2013 |
| JP | 2015-118327 A | 6/2015 |
| WO | WO-2020096699 A1 * | 5/2020 ............. B32B 25/08 |

* cited by examiner

*Primary Examiner* — Jessica L Eley
(74) *Attorney, Agent, or Firm* — Sughrue Mion, PLLC (57) ABSTRACT

An endless belt contains a resin, a filler A having an aspect ratio of 5 or more, and two or more fillers B having an aspect ratio of less than 5, in which a volume-based particle size distribution of the fillers B has two or more peaks among which a peak existing on a largest diameter side has a particle size Dmax that is equal to or more than 5 times and equal to or less than 50 times a particle size Dmin of a peak existing on a smallest diameter side.

20 Claims, 3 Drawing Sheets

ENDLESS BELT, FIXING BELT, FIXING DEVICE, AND IMAGE FORMING APPARATUS

CROSS-REFERENCE TO RELATED APPLICATIONS

This application is based on and claims priority under 35 USC 119 from Japanese Patent Application No. 2023-034955 filed Mar. 7, 2023.

BACKGROUND

(i) Technical Field

The present invention relates to an endless belt, a fixing belt, a fixing device, and an image forming apparatus.

(ii) Related Art

JP2015-118327A discloses "a resin substrate containing a resin, first filler that has an aspect ratio of 2 or more and is dispersed in the resin in a state of being aligned in an in-plane direction of the substrate, and a second filler that has an aspect ratio of 2 or more and a major axis shorter than a major axis of the first filler and is dispersed in the resin in a state of being aligned in a thickness direction of the substrate".

JP2006-259712A discloses "a seamless-type cylindrical heating and fixing member having an elastic layer, in which carbon fibers are arranged in the elastic layer, and a thermal conductivity in a thickness direction of the elastic layer is 1.0 W/(m·K) or more".

JP2013-189625A discloses "a cured substance of a highly thermal conductive resin containing a resin and a filler, in which in the filler, i) a content of a spherical small-particle-size filler having an average particle size D50 in a range of 0.1 μm or more and less than 1.0 μm is 15% to 25% by mass with respect to a total amount of the filler; ii) a content of a medium-particle-size filler having an average particle size D50 in a range of 3 to 20 μm is 15% to 25% by mass with respect to the total amount of the filler; and iii) a content of a spherical large-particle-size filler having an average particle size D50 in a range of 30 to 60 μm is 50% to 70% by mass with respect to the total amount of the filler, a maximum particle size of the filler is in a range of 30% to 70% of a film thickness of the cured substance of a highly thermal conductive resin, an average particle size of the large-particle-size filler is in a range of 18% to 35% of the film thickness of the cured substance of a highly thermal conductive resin, and a content of the filler is in a range of 70 to 90 vol % of a total volume of the cured substance of a highly thermal conductive resin".

JP1997-328610A discloses "a tubular substance made of a heat-resistant resin obtained by incorporating a first thermal conductive inorganic powder that is long in shape and a second thermal conductive inorganic powder that is not long in shape into a heat-resistant resin."

SUMMARY

Aspects of non-limiting embodiments of the present disclosure relate to an endless belt that contains a resin, a filler A having an aspect ratio of 5 or more, and two or more fillers B having an aspect ratio of less than 5, the endless belt being better in durability and thermal conductivity, compared to an endless belt in which a volume-based particle size distribution of the fillers B has two or more peaks among which a peak existing on a largest diameter side has a particle size Dmax that is less than 5 times or more than 50 times a particle size Dmin of a peak existing on a smallest diameter side.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Specific means for achieving the above object include the following aspects.

According to an aspect of the present disclosure, there is provided an endless belt that contains a resin, a filler A having an aspect ratio of 5 or more, and two or more fillers B having an aspect ratio of less than 5, in which a volume-based particle size distribution of the fillers B has two or more peaks among which a peak existing on a largest diameter side has a particle size Dmax that is equal to or more than 5 times or equal to or less than 50 times a particle size Dmin of a peak existing on a smallest diameter side.

BRIEF DESCRIPTION OF THE DRAWINGS

Exemplary embodiment(s) of the present invention will be described in detail based on the following figures, wherein.

DETAILED DESCRIPTION

The exemplary embodiments of the present invention will be described below. The following descriptions and examples merely illustrate exemplary embodiments, and do not limit the scope of the exemplary embodiments.

Regarding the ranges of numerical values described in stages in the present specification, the upper limit or lower limit of a range of numerical values may be replaced with the upper limit or lower limit of another range of numerical values described in stages.

Furthermore, in the present specification, the upper limit or lower limit of a range of numerical values may be replaced with values described in examples.

In the present specification, each component may include a plurality of corresponding substances.

In a case where the amount of each component in a composition is mentioned in the present specification, and there are two or more kinds of substances corresponding to each component in the composition, unless otherwise specified, the amount of each component means the total amount of two or more kinds of the substances present in the composition.

Endless Belt

The endless belt according to the present exemplary embodiment contains a resin, a filler A having an aspect ratio of 5 or more (hereinafter, also called "a needle-shaped or fibrous filler A"), and two or more fillers B having an aspect ratio of less than 5, in which a volume-based particle size distribution of the fillers B has two or more peaks among which a peak existing on a largest diameter side has a particle size Dmax that is equal to or more than 5 times and equal to or less than 50 times a particle size Dmin of a peak existing on a smallest diameter side.

Hereinafter, the filler A will be also called "needle-shaped or fibrous filler A", and the fillers B will be also called "spherical fillers B".

Having the above configuration, the endless belt according to the present exemplary embodiment is excellent in both the durability and thermal conductivity. The reason is presumed as follows.

In order to increase the thermal conductivity of an endless belt, a thermal conductive filler is mixed in.

However, in a case where the content of the thermal conductive filler is increased to improve thermal conductivity, durability is reduced.

Therefore, it is required to realize high thermal conductivity with a low content of the thermal conductive filler.

In order to increase the thermal conductivity, for example, it is preferable to form a long conductive path. In a case where only a large-diameter thermal conductive filler is mixed in as an attempt to form a long conductive path, the amount of the filler increases, resulting in deterioration of durability. Therefore, the mixing amount of the large-diameter thermal conductive filler is limited, and the number of filler contacts does not increase, which makes it difficult to form a long thermal conductive path. In contrast, mixing in only a small-diameter thermal conductive filler increases the number of filler contacts as well, but it is difficult to form a long thermal conductive path.

On the other hand, in the endless belt according to the present exemplary embodiment, a needle-shaped or fibrous filler A and two or more spherical fillers B are used as thermal conductive fillers. In addition, the volume-based particle size distribution of the spherical fillers B has two or more peaks among which a peak existing on a largest diameter side has a particle size Dmax that is equal to or more than 5 times and equal to or less than 50 times a particle size Dmin of a peak existing on a smallest diameter side.

As a result, a small-diameter filler B is interposed between a large-diameter spherical filler B and the needle-shaped or fibrous filler A, which increases the number of filler contacts and forms a long thermal conductive path. Furthermore, the total amount of the thermal conductive fillers is kept low.

It is assumed that the endless belt according to the present exemplary embodiment may be excellent in both the durability and thermal conductivity for the above reason.

Hereinafter, the endless belt according to the present exemplary embodiment will be specifically described.

The endless belt according to the present exemplary embodiment is a single-layer belt containing a resin and fillers. The endless belt may contain other additives as necessary.

Fillers

The fillers include a needle-shaped or fibrous filler A and two or more spherical fillers B.

The two or more spherical fillers B refer to two or more fillers having different maximum peak particle sizes in a volume-based particle size distribution, and may be formed of the same material or different materials.

As the fillers, a thermal conductive filler is used. The thermal conductive filler is a filler having a thermal conductivity of 20 W/m·k or more at 150° C. The thermal conductivity of the thermal conductive filler is a value determined by a thermal conductivity measuring device (ai-Phase Mobile manufactured by ai-Phase Co., Ltd.) under the condition of a load of 50 g. Furthermore, as the thermal conductivity of the thermal conductive filler, the manufacturer's nominal value or guaranteed value may be adopted.

Needle-Shaped or Fibrous Filler

Examples of the needle-shaped or fibrous filler A include carbides (such as carbon fibers and carbon nanotubes), metal oxides (such as silica, titania, and alumina), metal nitrides (such as silicon nitride, aluminum nitride, and boron nitride), and the like.

Aspect Ratio and Particle Size of Filler and the Like

The aspect ratio of the needle-shaped or fibrous filler A is 5 or more. From the viewpoint of improving the durability and thermal conductivity of the belt, for example, the aspect ratio is preferably 10 or more. However, from the viewpoint of reduction of filler strength, the aspect ratio of the needle-shaped or fibrous filler A is, for example, preferably 100 or less, more preferably 80 or less, and even more preferably 60 or less.

The aspect ratio of the needle-shaped or fibrous filler A means a ratio (filler length/filler diameter) between the length of the filler (that is, the major axis length) and the diameter of the filler (that is, the minor axis length).

The length of the needle-shaped or fibrous filler A is, for example, preferably 1 μm or more and 30 μm or less, and more preferably 3 μm or more and 15 μm or less.

The diameter of the needle-shaped or fibrous filler A is, for example, preferably 0.05 μm or more and 0.5 μm or less, and more preferably 0.05 μm or more and 0.2 μm or less.

Spherical Fillers B

Examples of the spherical fillers B include carbides (such as carbon black), metal oxides (such as silica, titania, and alumina), metal nitrides (such as silicon nitride, aluminum nitride, and boron nitride), and the like.

The aspect ratio of the spherical fillers is less than 5. From the viewpoint of improving the durability and thermal conductivity of the belt, for example, the aspect ratio is preferably 3 or less.

The aspect ratio of the spherical filler means a ratio (major axis length of filler/minor axis length of filler) between the major axis length of the filler and the minor axis length of the filler.

The major axis length of the filler means the maximum length of the filler.

The minor axis length of the filler means the length of the longest axis among the axes in a direction orthogonal to an extension of the major axis of the filler.

The volume-based particle size distribution of the spherical fillers B has two or more peaks among which a peak existing on a largest diameter side has a particle size Dmax that is equal to or more than 5 times and equal to or less than 50 times a particle size Dmin of a peak existing on a smallest diameter side. From the viewpoint of improving the durability and thermal conductivity of the belt, the particle size Dmax is, for example, preferably equal to or more than 5 times and equal to or less than 50 times the particle size Dmin, and more preferably equal to or more than 10 times and equal to or less than 20 times the particle size Dmin.

From the viewpoint of improving the durability and thermal conductivity of the belt, the particle size Dmax is, for example, preferably 5 μm or more and 20 μm or less, and more preferably 8 μm or more and 12 μm or less.

In order to incorporate the spherical fillers B having the aforementioned volume-based particle size distribution into the belt, for example, a method may be used in which at least a spherical filler having a volume-average particle size in the same range as the particle size Dmax and a spherical filler having a volume-average particle size in the same range as the particle size Dmin are incorporated into the belt.

From the viewpoint of improving the durability and thermal conductivity of the belt, a ratio (length L1/particle size Dmax) between a length L1 of the needle-shaped or fibrous filler A and a particle size Dmax of the peak existing on the largest diameter side is, for example, preferably 0.2 or more and 0.75 or less, more preferably 0.3 or more and 0.7 or less, and even more preferably 0.3 or more and 0.6 or less. In a case where the ratio is in the above range, the number of contacts between the spherical fillers B and the needle-shaped or fibrous filler A increases, which makes it easy to form a long thermal conductive path. As a result, the thermal conductivity of the belt is improved.

For example, it is preferable that at least one of the two or more spherical fillers B have a functional group B1 on the surface thereof, and at least another filler B among the two or more fillers B have a functional group B2 reacting with the functional group B1 on the surface thereof.

Specifically, for example, it is preferable that the filler B having the particle size Dmax on a peak existing on the largest diameter side have the functional group B1 on the surface thereof, and the filler B having the particle size Dmin on a peak existing on the smallest diameter side have the functional group B2 reacting with the functional group B1 on the surface thereof.

In a case where two spherical fillers B each having the functional group B1 and the functional group B2 are used, the two spherical fillers B are incorporated into the belt in a state of being in contact with each other through the functional group B1 and the functional group B2 bonded to each other. Accordingly, the number of contacts between the spherical fillers B and the needle-shaped or fibrous filler A increases, which makes it easy to form a long thermal conductive path. As a result, the thermal conductivity of the belt is improved.

The combination of the functional group B1 and the functional group B2 includes combinations of a functional group (1) selected from a hydroxy group, a carboxyl group, a carbonyl group, a sulfo group, a silanol group, and an epoxy group and a functional group (2) selected from a hydroxy group, an amino group, and a silanol group. Among these, from the viewpoint of dispersibility in the resin, for example, a combination of the functional group (1) selected from a hydroxy group and a carboxyl group and the functional group (2) selected from a hydroxy group and an amino group is preferable.

The functional group B1 may be the functional group (1), and the functional group B2 may be the functional group (2). Alternatively, the functional group B1 may be the functional group (2), and the functional group B2 may be the functional group (1).

The functional groups of the spherical fillers B may be functional groups derived from the materials of the fillers (for example, a hydroxyl group of silica and the like), or may be functional groups added as a result of a surface treatment performed on the fillers by using a surface treatment agent.

Measurement of Length, Diameter, and Volume-Based Particle Size Distribution of Fillers The elastic layer and the surface layer are peeled off from the belt by using a single-edged knife, and only the substrate layer is collected. The substrate layer is cut out in the thickness direction, and the cross section is checked with a scanning electron microscope (SEM) to observe the filler contained in the substrate layer.

From the observation image, the fillers having an aspect ratio of 5 or more are identified as the needle-shaped or fibrous filler A, and the fillers having an aspect ratio of less than 5 are identified as the spherical fillers B.

Next, the length and diameter (specifically, the maximum width among the widths of the fillers) of 100 needle-shaped or fibrous fillers A are measured, and an arithmetic mean thereof is calculated.

Meanwhile, the areas of 100 spherical fillers B are measured, the equivalent circle diameter ($=2\sqrt{\text{area}/\pi}$) is calculated from the obtained values of areas, and a cumulative distribution of the equivalent circle diameters is drawn from a small diameter side based on volume, thereby obtaining a volume-based particle size distribution.

Content of Fillers

In a case where the content of the fillers is increased, the thermal conductivity of the belt is improved, but the durability of the belt tends to deteriorate. On the other hand, in a case where the content of the fillers is reduced, the durability of the belt is improved, but the thermal conductivity of the belt tends to deteriorate. Therefore, from the viewpoint of improving the durability and thermal conductivity of the belt, for example, it is preferable to adjust the content of the fillers. Specifically, the content of the fillers is as follows.

The total content of the needle-shaped or fibrous filler A and the spherical fillers B with respect to the endless belt is, for example, preferably 5% by volume or more and 45% by volume or less, more preferably 10% by volume or more and 40% by volume or less, and even more preferably 15% by volume or more and 30% by volume or less.

The total content of all the fillers contained in the endless belt is, for example, preferably in the above range as well.

The content of the spherical fillers B with respect to the needle-shaped or fibrous filler A is, for example, preferably 20% by volume or more and 30% by volume or less, more preferably 24% by volume or more and 29% by volume or less, and even more preferably 25% by volume or more and 27% by volume or less.

In a case where the content of the spherical fillers B with respect to the needle-shaped or fibrous filler A is within the above range, the number of contacts between the spherical fillers B and the needle-shaped or fibrous filler A increases, which makes it easy to increase the thermal conductive path. As a result, the thermal conductivity is likely to be improved.

Herein, for example, the content of the filler B having the particle size Dmax is preferably higher than the content of the filler B having the particle size Dmin. In a case where contents of the spherical fillers B are as above, the number of contacts between the spherical filler B and the needle-shaped or fibrous filler A increases, which makes it easy to increase the thermal conductive path. As a result, the thermal conductivity is likely to be improved.

Specifically, a volume ratio of the content of the filler B having particle size Dmin on a peak existing on the smallest diameter side to the content of the filler B having the particle size Dmax on a peak existing on the largest diameter side (content of filler B having particle size Dmin/content of filler B having particle size Dmax) is, for example, preferably 11% or more and 45% or less, and more preferably 20% or more and 30% or less.

The volume ratio of the content of the filler B having the particle size Dmin to the content of the filler B having the particle size Dmax is defined by a frequency ratio of the particle size Dmax and the particle size Dmin in the volume-based particle size distribution obtained by the observation with a scanning electron microscope image.

Resin

As the resin, for example, a heat-resistant resin is preferable. The heat-resistant resin means a resin that has a melting point equal to or higher than the temperature of an environment where the resin is used for purposes (for example, a fixing temperature in a case where the resin is used for a fixing belt), or a resin that does not have a melting point and has a decomposition temperature equal to or higher than the temperature of an environment where the resin is used for purposes (for example, a fixing temperature in a case where the resin is used for a fixing belt).

Examples of the resin include heat-resistant resins having high heat resistance and high strength, such as liquid crystal materials including polyimide, aromatic polyamide, a thermotropic liquid crystal polymer, and the like. As the resin, in addition to these, polyester, polyethylene terephthalate, polyethersulfone, polyetherketone, polysulfone, polyimideamide, and the like are used.

Among these, as the resin, for example, polyimide is preferable.

Examples of the polyimide include an imidized polyamic acid (polyimide resin precursor) which is a polymer of a tetracarboxylic dianhydride and a diamine compound. Specific examples of the polyimide include a resin obtained by polymerizing equimolar amounts of a tetracarboxylic dianhydride and a diamine compound in a solvent to obtain a polyamic acid solution and imidizing the polyamic acid.

Examples of the tetracarboxylic dianhydride include both the aromatic and aliphatic tetracarboxylic dianhydride compounds. From the viewpoint of heat resistance, for example, an aromatic tetracarboxylic dianhydride compound is preferable.

Examples of the aromatic tetracarboxylic dianhydride include pyromellitic dianhydride, 3,3',4,4'-benzophenonetetracarboxylic dianhydride, 3,3',4,4'-biphenylsulfonetetracarboxylic dianhydride, 2,3,6,7-1,4,5,8-naphthalenetetracarboxylic dianhydride, naphthalenetetracarboxylic dianhydride, 3,3',4,4'-biphenylethertetracarboxylic dianhydride, 3,3',4,4'-dimethyldiphenylsilanetetracarboxylic dianhydride, 3,3',4,4'-tetraphenylsilanetetracarboxylic dianhydride, 1,2,3,4-furanetetracarboxylic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropyridene diphthalic dianhydride, 3,3',4,4'-biphenyltetracarboxylic dianhydride, 2,3,3',4'-biphenyltetracarboxylic dianhydride, bis(phthalic)phenylphosphine oxide dianhydride, p-phenylene-bis(triphenylphthalic)dianhydride, m-phenylene-bis(triphenylphthalic)dianhydride, bis(triphenylphthalic)-4,4'-diphenyl ether dianhydride, bis(triphenylphthalic)-4,4'-diphenylmethane dianhydride, and the like.

Examples of the aliphatic tetracarboxylic dianhydride include an aliphatic or alicyclic tetracarboxylic dianhydride such as butanetetracarboxylic dianhydride, 1,2,3,4-cyclobutanetetracarboxylic dianhydride, 1,3-dimethyl-1,2,3,4-cyclobutanetetracarboxylic dianhydride, 1,2,3,4-cyclopentanetetracarboxylic dianhydride, 2,3,5-tricarboxycyclopentylacetic dianhydride, 3,5,6-tricarboxyorbornane-2-acetic dianhydride, 2,3,4,5-tetrahydrofuran tetracarboxylic dianhydride, 5-(2,5-dioxotetrahydrofuryl)-3-methyl-3-cyclohexene-1,2-dicarboxylic dianhydride, and bicyclo[2,2,2]-oct-7-ene-2,3,5,6-tetracarboxylic dianhydride; an aliphatic tetracarboxylic dianhydride having an aromatic ring such as 1,3,3a,4,5,9b-hexahydro-2,5-dioxo-3-furanyl)-naphtho[1,2-c]furan-1,3-dione, 1,3,3a,4,5,9b-hexahydro-5-methyl-5-(tetrahydro-2,5-dioxo-3-furanyl)-naphtho[1,2-c]furan-1,3-dione, and 1,3,3a,4,5,9b-hexahydro-8-methyl-5-(tetrahydro-2,5-dioxo-3-furanyl)-naphtho[1,2-c]furan-1,3-dione, and the like.

Among these, as the tetracarboxylic dianhydride, for example, an aromatic tetracarboxylic dianhydride is preferable. Specifically, for example, pyromellitic dianhydride, 3,3',4,4'-biphenyltetracarboxylic dianhydride, 2,3,3',4'-biphenyltetracarboxylic dianhydride, 3,3',4,4'-biphenylethertetracarboxylic dianhydride, and 3,3',4,4'-benzophenonetetracarboxylic dianhydride are preferable, pyromellitic dianhydride, 3,3',4,4'-biphenyltetracarboxylic dianhydride, and 3,3',4,4'-benzophenonetetracarboxylic dianhydride are more preferable, and 3,3',4,4'-biphenyltetracarboxylic dianhydride is particularly preferable.

One tetracarboxylic dianhydride may be used alone, or two or more tetracarboxylic dianhydrides may be used in combination.

In a case where two or more tetracarboxylic dianhydrides are used in combination, either aromatic tetracarboxylic dianhydrides or aliphatic tetracarboxylic dianhydrides may be used in combination, or an aromatic tetracarboxylic dianhydride and an aliphatic tetracarboxylic dianhydride may be used in combination.

Incidentally, a diamine compound is a compound having two amino groups in the molecular structure. Examples of the diamine compound include both the aromatic and aliphatic diamine compounds. Among these, for example, an aromatic diamine compound is preferable.

Examples of the diamine compound include aromatic diamines such as p-phenylenediamine, m-phenylenediamine, 4,4'-diaminodiphenylmethane, 4,4'-diaminodiphenylethane, 4,4'-diaminodiphenylether, 4,4'-diaminodiphenylsulfide, 4,4'-diaminodiphenylsulfone, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 4,4'-diaminobenzanilide, 3,5-diamino-3'-trifluoromethylbenzanilide, 3,5-diamino-4'-trifluoromethylbenzanilide, 3,4'-diaminodiphenylether, 2,7-diaminofluorene, 2,2-bis(4-aminophenyl)hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 2,2-bis[4-(4-aminophenoxy)phenyl]propane, 2,2-bis[4-(4-aminophenoxy)phenyl]hexafluoropropane, 1,4-bis(4-aminophenoxy)benzene, 4,4'-bis(4-aminophenoxy)-biphenyl, 1,3'-bis(4-aminophenoxy)benzene, 9,9-bis(4-aminophenyl)fluorene, 4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]hexafluoropropane, and 4,4'-bis[4-(4-amino-2-trifluoromethyl)phenoxy]-octafluorobiphenyl; aromatic diamines having two amino groups bonded to an aromatic ring and hetero atoms other than nitrogen atoms of the amino groups, such as diaminotetraphenyl thiophene; aliphatic and alicyclic diamines such as 1,1-metaxylylenediamine, 1,3-propanediamine, tetramethylenediamine, pentamethylenediamine, octamethylenediamine, nonamethylenediamine, 4,4-diaminoheptamethylenediamine, 1,4-diaminocyclohexane, isophoronediamine, tetrahydrodicyclopentadienylenediamine, tricyclo[6,2,1,0$^{2.7}$]-undecylene hexahydro-4,7-methanoindanylene dimethylenediamine, dimethyldiamine, and 4,4'-methylenebis(cyclohexylamine), and the like.

Among these, as the diamine compound, for example, an aromatic diamine compound is preferable. Specifically, for example, p-phenylenediamine, m-phenylenediamine, 4,4'-diaminodiphenylmethane, 4,4'-diaminodiphenylether, 3,4'-diaminodiphenylether, 4,4'-diaminodiphenylsulfide, and 4,4'-diaminodiphenylsulfone are preferable, and 4,4'-diaminodiphenyl ether and p-phenylenediamine are particularly preferable.

One diamine compound may be used alone, or two or more diamine compounds may be used in combination.

In a case where two or more diamine compounds are used in combination, either aromatic diamine compounds or aliphatic diamine compounds may be used in combination, or an aromatic diamine compound and an aliphatic diamine compound may be combined.

Among these, from the viewpoint of heat resistance, as a polyimide, for example, an aromatic polyimide (specifically, an imidized polyamic acid (a polyimide resin precursor) which is a polymer of an aromatic tetracarboxylic dianhydride and an aromatic diamine compound) is preferable.

The aromatic polyimide is, for example, more preferably a polyimide having a structural unit represented by the following General Formula (PI1).

(PI1)

In General Formula (PI1), $R^{P1}$ represents a phenyl group or a biphenyl group, and $R^{P2}$ represents a divalent aromatic group.

Examples of the divalent aromatic group represented by $R^{P2}$ include a phenylene group, a naphthyl group, a biphenyl group, a diphenyl ether group, and the like. As the divalent aromatic group, from the viewpoint of bending durability, for example, a phenylene group or a biphenyl group is preferable.

The number-average molecular weight of the polyimide is, for example, preferably 5,000 or more and 100,000 or less, more preferably 7,000 or more and 50,000 or less, and even more preferably 10,000 or more and 30,000 or less.

The number-average molecular weight of the polyimide precursor is measured by gel permeation chromatography (GPC) under the following measurement conditions.

Column: Tosoh TSKgel-M (7.8 mm I.D×30 cm)
Eluent: DMF (dimethylformamide)/30 mM LiBr/60 mM phosphoric acid
Flow rate: 0.6 ml/min
Injection amount: 60 μL
Detector: RI (differential refractive index detector)

The content of the resin in the substrate layer with respect to the total mass of the substrate layer is, for example, preferably 80% by mass or more, more preferably 85% by mass or more, and even more preferably 90% by mass or more.

Other Additives

Examples of other additives include various known additives such as lubricants.

Film Thickness of Endless Belt

From the viewpoint of durability, thermal conductivity, and the like, the film thickness of the endless belt is, for example, preferably 30 μm or more and 200 μm or less, more preferably 50 μm or more and 150 μm or less, and particularly preferably 70 μm or more and 120 μm or less.

Physical Properties of Endless Belt

Thermal Conductivity

The thermal conductivity of the endless belt according to the present exemplary embodiment is, for example, preferably 0.5 W/m·K or more and 10 W/m·K or less, more preferably 0.6 W/m·K or more and 10 W/m·K or less, and even more preferably 1.0 W/m·K or more and 10 W/m·K or less.

The method of measuring the thermal conductivity is as follows.

A sample is collected from the endless belt as a measurement target, and the thermal conductivity of the collected sample is measured under the condition of a load of 50 g by a temperature wave analysis method using ai-phase (manufactured by Ai-Phase Co., Ltd.)

Manufacturing Method of Endless Belt According to the Present Exemplary Embodiment The endless belt according to the present exemplary embodiment can be manufactured by a known method of preparing a coating liquid for forming a belt containing a resin, a filler, and additives used as necessary, and coating a cylindrical substrate with the obtained coating liquid for forming a belt, followed by drying.

In a case where the resin is polyimide, the endless belt according to the present exemplary embodiment can be manufactured by a known method of preparing a coating liquid for forming a substrate layer containing a polyamic acid (a polyimide resin precursor), a filler, and additives used as necessary, and coating a cylindrical substrate with the obtained coating liquid for forming a substrate layer, followed by baking (that is, imidization).

Use

The endless belt according to the present exemplary embodiment is used for purposes that requires high thermal conductivity (for example, a fixing belt (a substrate layer thereof) and the like).

Fixing Device

Figure 1:
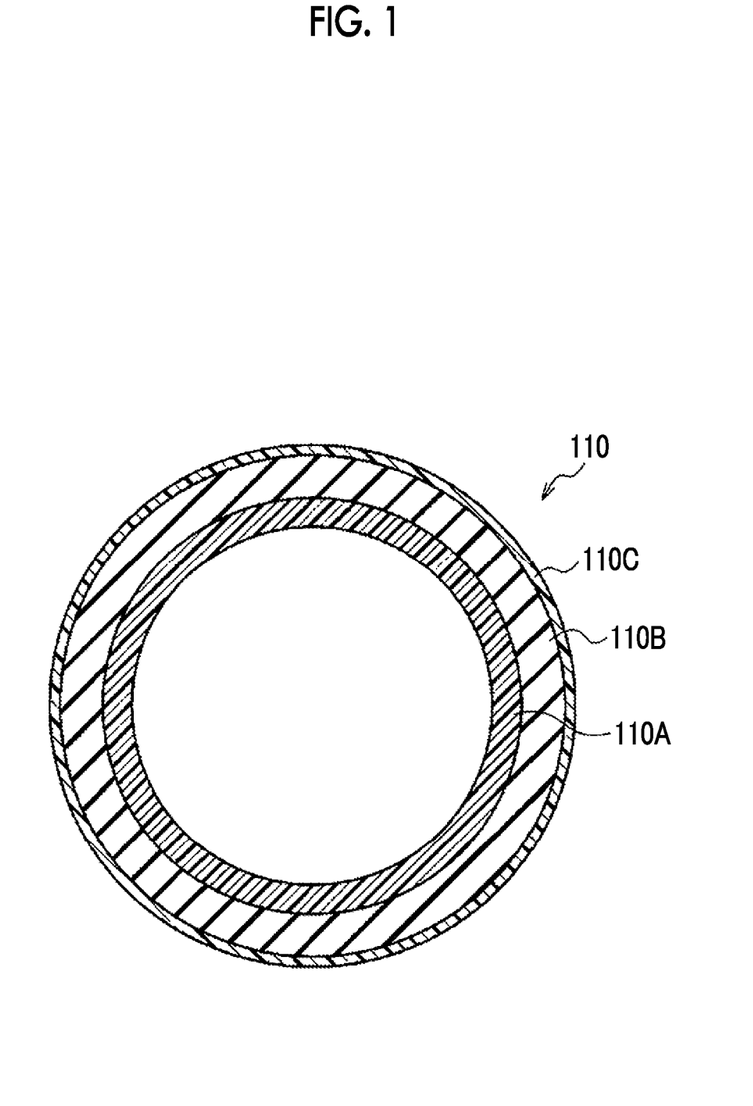
FIG. 1 is a schematic cross-sectional view showing an example of a fixing belt according to the present exemplary embodiment.

Examples of the fixing device according to the present exemplary embodiment include a fixing device 110 shown in FIG. 1 having a substrate layer 110A, an elastic layer 110B provided on the substrate layer 110A, and a release layer 110C provided on the elastic layer 110B. As the substrate layer 110A, the endless belt according to the present exemplary embodiment described above is used.

The layer configuration of the fixing device 110 is not limited to the layer configuration shown in FIG. 1, and may be a layer configuration in which an adhesive layer is interposed between the elastic layer 110B and the release layer 110C.

Hereinafter, the constituent components of the fixing belt according to the present exemplary embodiment will be specifically described. Note that the reference numerals will not be described.

Elastic Layer

The elastic layer is not particularly limited as long as it is a layer having elasticity.

The elastic layer is a layer provided from the viewpoint of imparting elasticity against the pressure applied to the fixing belt from the outer peripheral side, and plays a role of conforming to the roughness of a toner image on a recording medium such that the surface of the fixing belt tightly adheres to the toner image.

It is preferable that the elastic layer be configured, for example, with an elastic material which restores the original shape even being deformed by the application of an external force of 100 Pa.

Examples of the elastic material used for the elastic layer include a fluororesin, a silicone resin, silicone rubber, fluororubber, fluorosilicone rubber, and the like. As the material of the elastic layer, from the viewpoint of heat resistance, thermal conductivity, insulating properties, and the like, for example, silicone rubber and fluororubber are preferable, and silicone rubber is more preferable.

Examples of the silicone rubber include RTV silicone rubber, HTV silicone rubber, liquid silicone rubber, and the like. Specific examples thereof include polydimethyl silicone rubber (MQ), methyl vinyl silicone rubber (VMQ), methyl phenyl silicone rubber (PMQ), and fluorosilicone rubber (FVMQ), and the like.

As the silicone rubber, for example, silicone rubber that is crosslinked mainly by an addition reaction is preferable. Various types of functional groups are known for silicone rubber. As the silicone rubber, for example, dimethyl silicone rubber having a methyl group, methyl phenyl silicone rubber having a methyl group and a phenyl group, vinyl silicone rubber having a vinyl group (vinyl group-containing silicone rubber), and the like are preferable.

Furthermore, as the silicone rubber, for example, vinyl silicone rubber having a vinyl group is more preferable, and silicone rubber that has an organopolysiloxane structure having a vinyl group and a hydrogen organopolysiloxane structure having a hydrogen atom bonded to a silicon atom (SiH) is even more preferable.

Examples of the fluororubber include vinylidene fluoride-based rubber, ethylene tetrafluoride/propylene-based rubber, ethylene tetrafluoride/perfluoromethylvinyl ether rubber, phosphazene-based rubber, fluoropolyether, and the like.

It is preferable that the elastic material used for the elastic layer contain, for example, silicone rubber as a main component (that is, the content of the silicone rubber is, for example, preferably 50% by mass or more with respect to the total mass of the elastic material).

The content of the silicone rubber with respect to the total mass of the elastic material used in the elastic layer is, for example, more preferably 90% by mass or more, and even more preferably 99% by mass or more. The content of the silicone rubber may be 100% by mass.

The elastic layer may contain an inorganic filler in addition to the elastic material, for the purpose of reinforcement, heat resistance, heat transfer, or the like. Examples of the inorganic filler include known inorganic fillers. Preferred examples of the inorganic filler include fumed silica, crystalline silica, iron oxide, alumina, metallic silicon, and the like.

Examples of the material of the inorganic filler include, in addition to the above ones, known inorganic fillers such as carbides (for example, carbon black, carbon fibers, carbon nanotubes, and the like), titanium oxide, silicon carbide, talc, mica, kaolin, calcium carbonate, calcium silicate, magnesium oxide, graphite, silicon nitride, boron nitride, cerium oxide, and magnesium carbonate.

Among these, in view of thermal conductivity, for example, silicon nitride, silicon carbide, graphite, boron nitride, and carbides are preferable.

The elastic layer may contain, for example, a softener (such as a paraffin-based softener), a processing aid (such as stearic acid), an antioxidant (such as an amine-based antioxidant), a vulcanizing agent (such as sulfur, a metal oxide, or a peroxide), and the like, as additives.

The thickness of the elastic layer is, for example, preferably 30 μm or more and 600 μm or less and more preferably 100 μm or more and 500 μm or less.

The elastic layer may be formed by a known method. For example, a coating method is used.

In a case where silicone rubber is used as the elastic material of the elastic layer, for example, first, a coating liquid for forming an elastic layer is prepared which contains liquid silicone rubber that turns into silicone rubber by being cured by heating. Next, the substrate layer is coated with the coating liquid for forming an elastic layer to form a coating film, and the coating film is vulcanized as necessary, thereby forming an elastic layer on the substrate layer. During the vulcanization of the coating film, a vulcanization temperature is, for example, 150° C. or higher and 250° C. or lower, and the vulcanization time is, for example, 30 minutes or longer and 120 minutes or less.

Release Layer

The release layer is a layer that plays a role of inhibiting the molten toner image from being fixed to a surface (outer peripheral surface) coming into contact with a recording medium during fixing.

For the release layer is, for example, heat resistance or release properties are required. In this respect, for example, it is preferable to use a heat-resistant release material as the material configuring the release layer. Specific examples of such a material include fluororubber, a fluororesin, a silicone resin, a polyimide resin, and the like.

Among these, for example, a fluororesin is preferable as the heat-resistant release material.

Specific examples of the fluororesin include a tetrafluoroethylene-perfluoroalkylvinyl ether copolymer (PFA), polytetrafluoroethylene (PTFE), a tetrafluoroethylene-hexafluoropropylene copolymer (FEP), a polyethylene-tetrafluoroethylene copolymer (ETFE), polyvinylidene fluoride (PVDF), polychlorotrifluoroethylene (PCTFE), vinyl fluoride (PVF), and the like.

A surface treatment may be performed on a surface of the release layer, the surface being on the side of the elastic layer. The surface treatment may be a wet treatment or a dry treatment, and examples thereof include a liquid ammonia treatment, an excimer laser treatment, a plasma treatment, and the like.

The film thickness of the release layer is, for example, preferably 10 μm or more and 100 μm or less, and more preferably 20 μm or more and 50 μm or less.

The release layer may be formed by a known method. For example, a coating method may be used.

Furthermore, a tube to be a release layer may be prepared in advance, and the outer periphery of the elastic layer may be covered with the tube, thereby forming the release layer. Note that an adhesive layer (for example, an adhesive layer containing a silane coupling agent having an epoxy group) may be formed on the inner surface of the tubular surface layer, and then the outer periphery may be covered with the tubular surface layer.

Film Thickness of Fixing Belt

The film thickness of the fixing belt according to the present exemplary embodiment is, for example, preferably 90 μm or more and 600 μm or less, more preferably 200 μm or more and 600 μm or less, and even more preferably 300 μm or more and 550 μm or less.

Use of Fixing Belt

The fixing belt according to the present disclosure is used as, for example, both a heating belt and a pressure belt.

Fixing Device

The fixing device according to the present exemplary embodiment has various configurations. Examples of the fixing device include a fixing device including a first rotary member and a second rotary member that is arranged in contact with an outer surface of the first rotary member, in which a recording medium having a toner image formed on the surface of thereof is inserted into a contact portion between the first rotary member and the second rotary member such that the toner image is fixed. Furthermore, the fixing belt according to the present exemplary embodiment is used as at least one of the first rotary member or the second rotary member.

Hereinafter, as the fixing device according to the present exemplary embodiment, a fixing device will be described which includes a heating belt in which the fixing belt according to the present exemplary embodiment is used and a heating roll.

The fixing device according to the present exemplary embodiment is not limited to the above exemplary embodiment, and may be a fixing device including a heating belt and a pressure belt or a fixing device including a heating roll and a pressure belt. In these fixing devices, the fixing belt according to the present exemplary embodiment can be used as both the heating belt and pressure belt.

Exemplary Embodiment of Fixing Device

Figure 2:
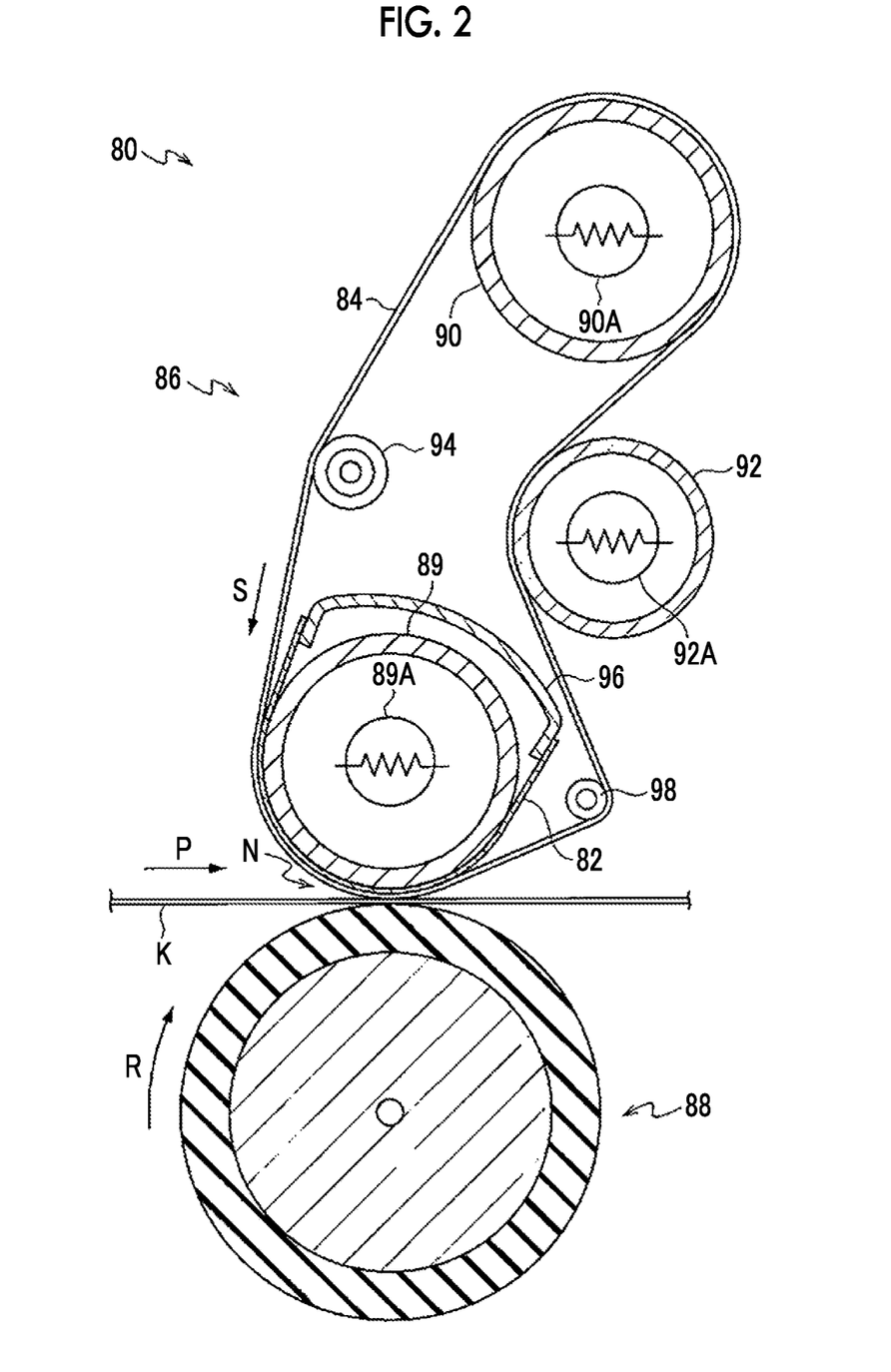
FIG. 2 is a schematic configuration view showing an example of a fixing device according to the present exemplary embodiment.

The first exemplary embodiment of the fixing device will be described with reference to FIG. 2. FIG. 2 is a schematic view showing an example (that is, a fixing device 80) of an exemplary embodiment of the fixing device.

As shown in FIG. 2, the fixing device 80 is configured, for example, with a fixing belt module 86 including a heating belt 84 (an example of the first rotary member) and a pressure roll 88 (an example of the second rotary member) arranged in a state of being pressed on a heating belt 84 (fixing belt module 86). For example, a nip region N (nip portion) is formed in a contact portion between the heating belt 84 (fixing belt module 86) and the pressure roll 88. In the nip region N, paper K (an example of a recording medium) is pressed and heated such that a toner image is fixed.

The fixing belt module 86 includes, for example, an endless heating belt 84, a heating and pressing roll 89 around which the heating belt 84 is wound on the side of the pressure roll 88 and which is driven to rotate by the rotational force of a motor (not shown in the drawing) and presses the heating belt 84 from an inner peripheral surface thereof toward the pressure roll 88, and a support roll 90 which supports the heating belt 84 from the inside at a position different from the heating and pressing roll 89.

The fixing belt module 86 is provided with, for example, a support roll 92 which is disposed outside the heating belt 84 and regulates the circulating path thereof, a posture correction roll 94 which corrects the posture of the heating belt 84 from the heating and pressing roll 89 to the support roll 90, and a support roll 98 which applies tension to the heating belt 84 from the inner peripheral surface on the downstream side of the nip region N formed between the heating belt 84 and the pressure roll 88.

The fixing belt module 86 is provided, for example, such that a sheet-like sliding member 82 is interposed between the heating belt 84 and the heating and pressing roll 89.

The sliding member 82 is provided such that the sliding surface thereof is in contact with, for example, the inner peripheral surface of the heating belt 84, and is involved in holding and supplying of oil existing between the sliding member 82 and the heating belt 84.

The sliding member 82 is provided, for example, in a state where both ends thereof are being supported by a support member 96.

On the inside of the heating and pressing roll 89, for example, a halogen heater 89A (an example of a heat source) is provided.

The support roll 90 is, for example, a cylindrical roll formed of aluminum. A halogen heater 90A (an example of a heat source) is provided on the inside of the support roll 90, such that the heating belt 84 is heated from the inner peripheral surface side.

Both end portions of the support roll 90 are provided with, for example, spring members (not shown in the drawing) pressing the heating belt 84 to the outside.

The support roll 92 is, for example, a cylindrical roll made of aluminum. A release layer consisting of a fluororesin having a film thickness of 20 μm is formed on a surface of the support roll 92.

The release layer of the support roll 92 is formed, for example, to prevent a toner or paper powder from the outer peripheral surface of the heating belt 84 from depositing on the support roll 92.

For example, a halogen heater 92A (an example of a heat source) is disposed on the inside of the support roll 92, such that the heating belt 84 is heated from the outer peripheral surface side.

That is, for example, the fixing belt module 86 is configured such that the heating belt 84 is heated, for example, by the heating and pressing roll 89, the support roll 90, and the support roll 92.

The posture correction roll 94 is, for example, a cylindrical roll made of aluminum, and an end position measuring mechanism (not shown in the drawing) for measuring the end position of the heating belt 84 is disposed in the vicinity of the posture correction roll 94.

The posture correction roll 94 is provided with, for example, an axial displacement mechanism (not shown in the drawing) which displaces the contact position of the heating belt 84 in the axial direction according to the measurement result of the end position measuring mechanism, and is configured to control meandering of the heating belt 84.

The pressure roll 88 is provided, for example, such that the pressure roll 88 is rotatably supported and pressed on the site of the heating and pressing roll 89 around which the heating belt 84 is wound by an urging device such as a spring not shown in the drawing. As a result, as the heating belt 84 (heating and pressing roll 89) of the fixing belt module 86 rotates and moves in the direction of the arrow S, the pressure roll 88 follows the heating belt 84 (heating and pressing roll 89) and rotates and moves in the direction of the arrow R.

The paper K having an unfixed toner image (not shown in the drawing) is transported in the direction of an arrow P and is guided to the nip region N of the fixing device 80. While the paper K is passing through the nip region N, the unfixed toner image on the paper K is fixed by the pressure and heat acting on the nip region N.

For the fixing device 80, an embodiment has been described in which a halogen heater (halogen lamp) is used as an example of a plurality of heat sources. However, the fixing device is not limited thereto, and a radiation lamp heating element (a heating element generating radiation (such as infrared rays) and a resistance heating element (a heating element generating Joule heat by passing an electric current through a resistor: for example, a heating element obtained by forming a film with a resistor on a ceramic substrate and baking the resultant) other than the halogen heater may be used.

Image Forming Apparatus

Next, the image forming apparatus according to the present exemplary embodiment will be described.

The image forming apparatus according to the present exemplary embodiment includes an image holder, a charging device that charges a surface of the image holder, an electrostatic latent image forming device that forms an electrostatic latent image on the charged surface of the image holder, a developing device that develops the electrostatic latent image formed on the surface of the image holder with a developer containing a toner to form a toner image, a transfer device that transfers the toner image to a surface of a recording medium, and the fixing device that fixes the toner image to the recording medium, in which the fixing device according to the present exemplary embodiment is used as the fixing device.

In the image forming apparatus according to the present exemplary embodiment, the fixing device may be made into a cartridge such that the fixing device is detachable from an image forming apparatus. That is, the image forming apparatus according to the present exemplary embodiment may include the fixing device according to the present exemplary embodiment, as a device configuring a process cartridge.

Hereinafter, the image forming apparatus according to the present exemplary embodiment will be described with reference to a drawing.

Figure 3:
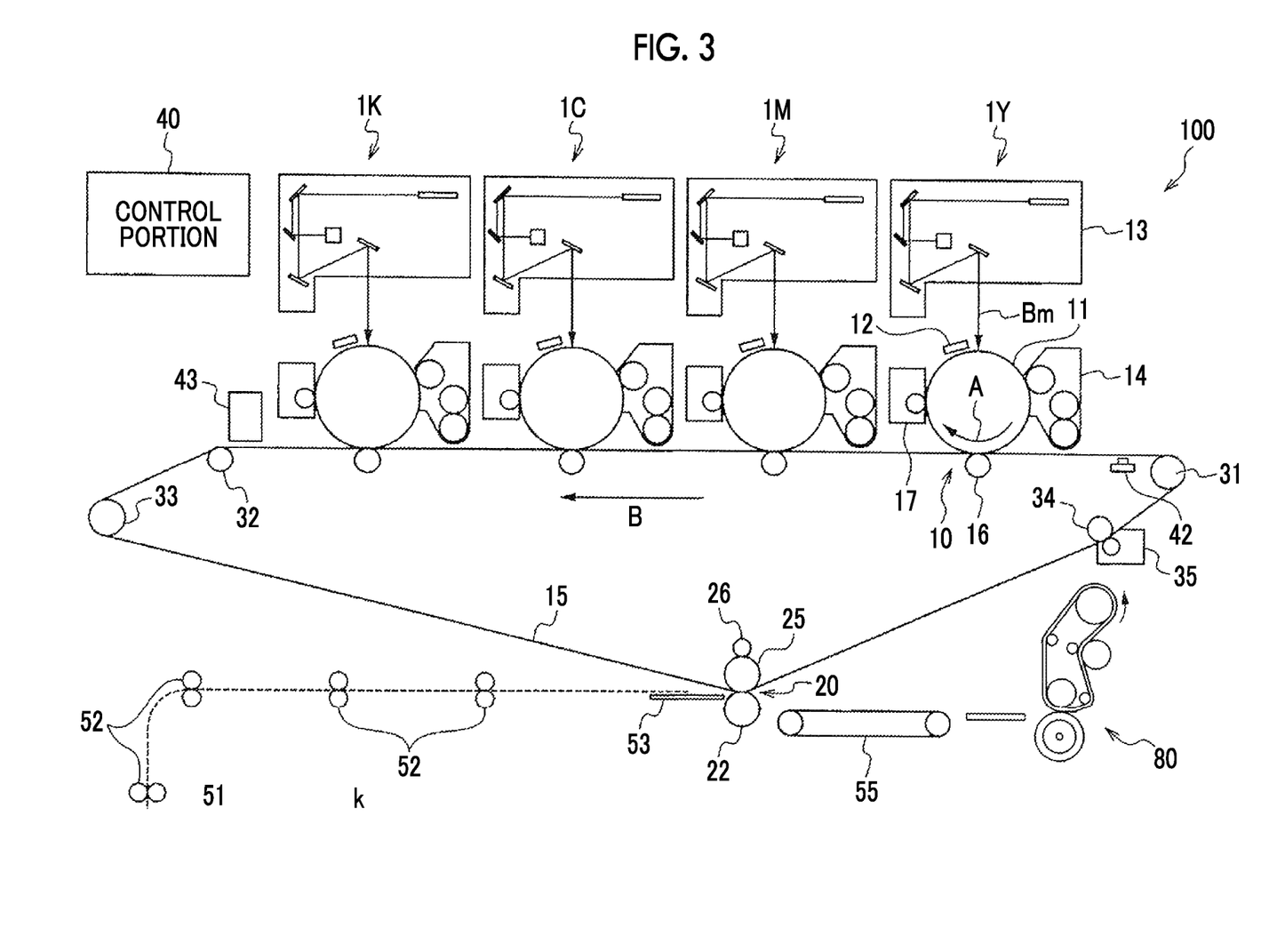
FIG. 3 is a schematic configuration view showing an example of an image forming apparatus according to the present exemplary embodiment.

FIG. 3 is a schematic configuration view showing an example of the image forming apparatus according to the present exemplary embodiment.

As shown in FIG. 3, an image forming apparatus 100 is, for example, an intermediate transfer-type image forming apparatus that is generally called a tandem type, and includes a plurality of image forming units 1Y, 1M, 1C, and 1K in which a toner image of each color component is formed by an electrophotographic method, a primary transfer portion 10 that performs sequential transfer (primary transfer) of the toner image of each color component formed by each of the image forming units 1Y, 1M, 1C, and 1K to an intermediate transfer belt 15, a secondary transfer portion 20 that performs batch transfer (secondary transfer) of the overlapped toner images transferred to the intermediate transfer belt 15 to paper K as a recording medium, and a fixing device 80 that fixes the images transferred by the secondary transfer on the paper K. The image forming apparatus 100 also has a control portion 40 that controls the operation of each device (each portion).

As the fixing device 80, the fixing device according to the present exemplary embodiment is used. The image forming apparatus 100 may include the fixing device according to the present exemplary embodiment, and is not limited to the fixing device 80.

Each of the image forming units 1Y, 1M, 1C, and 1K of the image forming apparatus 100 includes a photoreceptor 11 that rotates in the direction of an arrow A, as an example of an image holder that holds a toner image formed on the surface.

Around the photoreceptor 11, there are provided a charger 12 for charging the photoreceptor 11 as an example of a charging device and a laser exposure machine 13 for drawing an electrostatic latent image on the photoreceptor 11 as an example of an electrostatic latent image forming device (in FIG. 4, the exposure beam is represented by a mark Bm).

Around the photoreceptor 11, as an example of a developing device, there are provided a developing machine 14 that contains toners of each color component and makes the electrostatic latent image on the photoreceptor 11 into a visible image by using the toners and a primary transfer roll 16 that transfers toner images of each color component formed on the photoreceptor 11 to the intermediate transfer belt 15 by the primary transfer portion 10.

Around the photoreceptor 11, there are provided a photoreceptor cleaner 17 that removes the residual toner on the photoreceptor 11 and devices for electrophotography, such as the charger 12, the laser exposure machine 13, the developing machine 14, the primary transfer roll 16, and the photoreceptor cleaner 17, that are arranged in sequence along the rotation direction of the photoreceptor 11. These image forming units 1Y, 1M, 1C, and 1K are substantially linearly arranged in order of yellow (Y), magenta (M), cyan (C), and black (K) from the upstream side of the intermediate transfer belt 15.

The intermediate transfer belt 15 which is an intermediate transfer member is configured with a film-shaped pressure belt including a base layer that is a resin such as polyimide or polyamide and containing an appropriate amount of an antistatic agent such as carbon black. Furthermore, the intermediate transfer belt 15 is configured to have a volume resistivity of $10^6$ Ωcm or more and $10^{14}$ Ωcm or less and has a film thickness of about, for example, 0.1 mm.

By various rolls, the intermediate transfer belt 15 is driven to circulate (rotate) in a direction B shown in FIG. 3 at a speed fit for the purpose. The image forming apparatus 100 has, as the various rolls, a driving roll 31 that is driven by a motor (not shown in the drawing) excellent in maintaining a constant speed and rotates the intermediate transfer belt 15, a support roll 32 that supports the intermediate transfer belt 15 substantially linearly extending along the arrangement direction of the photoreceptors 11, a tension applying roll 33 that applies tension to the intermediate transfer belt 15 and functions as a correcting roll preventing meandering of the intermediate transfer belt 15, a back roll 25 that is provided in the secondary transfer portion 20, and a back roll 34 for cleaning that is provided in a cleaning portion scrapping off the residual toner on the intermediate transfer belt 15.

The primary transfer portion 10 is configured with the primary transfer roll 16 that is arranged to face the photoreceptor 11 across the intermediate transfer belt 15. The primary transfer roll 16 is configured with a core and a sponge layer as an elastic layer fixed around the core. The core is a cylindrical rod configured with a metal such as iron or SUS. The sponge layer is a sponge-like cylindrical roll which is formed of blended rubber of NBR, SBR, and EPDM mixed with a conducting agent such as carbon black and has a volume resistivity of $10^{7.5}$ Ωcm or more and $10^{8.5}$ Ωcm or less.

The primary transfer roll 16 is arranged to be pressed on the photoreceptor 11 across the intermediate transfer belt 15, and the polarity of voltage (primary transfer bias) applied to the primary transfer roll 16 is opposite to the charging polarity (negative polarity, the same shall apply hereinafter) of the toner. As a result, the toner image on each photoreceptor 11 is sequentially electrostatically sucked onto the intermediate transfer belt 15, which leads to the formation of overlapped toner images on the intermediate transfer belt 15.

The secondary transfer portion 20 includes the back roll 25 and a secondary transfer roll 22 that is arranged on a toner image-holding surface side of the intermediate transfer belt 15.

The surface of the back roll 25 is configured with a tube of blended rubber of EPDM and NBR in which carbon is dispersed, and the inside of the back roll 25 is configured with EPDM rubber. Furthermore, the back roll 25 is formed such that the surface resistivity thereof is $10^7 \Omega/\square$ or more and $10^{10} \Omega/\square$ or less. The hardness of the back roll 25 is set to, for example, 70° (ASKER C: manufactured by KOBUNSHI KEIKI CO., LTD., the same shall apply hereinafter). The back roll 25 is arranged on the back surface side of the intermediate transfer belt 15 to configure a counter electrode of the secondary transfer roll 22. A power supply roll 26 made of a metal to which secondary transfer bias is stably applied is arranged to come into contact with the back roll 25.

The secondary transfer roll 22 is configured with a core and a sponge layer as an elastic layer fixed around the core. The core is a cylindrical rod configured with a metal such as iron or SUS. The sponge layer is a sponge-like cylindrical roll which is formed of blended rubber of NBR, SBR, and EPDM mixed with a conducting agent such as carbon black and has a volume resistivity of $10^{7.5}$ $\Omega$cm or more and $10^{8.5}$ $\Omega$cm or less.

The secondary transfer roll 22 is arranged to be pressed on the back roll 25 across the intermediate transfer belt 15. The secondary transfer roll 22 is grounded such that the secondary transfer bias is formed between the secondary transfer roll 22 and the back roll 25, which induces secondary transfer of the toner image onto the paper K transported to the secondary transfer portion 20.

On the downstream side of the secondary transfer portion 20 of the intermediate transfer belt 15, an intermediate transfer belt cleaner 35 separable from the intermediate transfer belt 15 is provided which removes the residual toner or paper powder on the intermediate transfer belt 15 remaining after the secondary transfer and cleans the surface of the intermediate transfer belt 15.

The intermediate transfer belt 15, the primary transfer portion 10 (primary transfer roll 16), and the secondary transfer portion 20 (secondary transfer roll 22) correspond to an example of the transfer device.

On the other hand, on the upstream side of the yellow image forming unit 1Y, a reference sensor (home position sensor) 42 is arranged which generates a reference signal to be a reference for taking the image forming timing in each of the image forming units 1Y, 1M, 1C, and 1K. The reference sensor 42 recognizes a mark provided on the back side of the intermediate transfer belt 15 and generates a reference signal. Each of the image forming units 1Y, 1M, 1C, and 1K is configured such that these units start to form images according to the instruction from the control portion 40 based on the recognition of the reference signal.

On the downstream side of the black image forming unit 1K, an image density sensor 43 for adjusting image quality is arranged.

The image forming apparatus according to the present disclosure includes, as a transport device for transporting the paper K, a paper storage portion 50 that stores the paper K, a paper feeding roll 51 that takes out and transports the paper K stacked in the paper storage portion 50 at a predetermined timing, a transport roll 52 that transports the paper K transported by the paper feeding roll 51, a transport guide 53 that sends the paper K transported by the transport roll 52 to the secondary transfer portion 20, a transport belt 55 that transports the paper K transported after going through secondary transfer by the secondary transfer roll 22 to the fixing device 80, and a fixing entrance guide 56 that guides the paper K to the fixing device 80.

Next, the basic image forming process of the image forming apparatus according to the present disclosure will be described.

In the image forming apparatus according to the present disclosure, image data output from an image reading device not shown in the drawing, a personal computer (PC) not shown in the drawing, or the like is subjected to image processing by an image processing device not shown in the drawing, and then the image forming units 1Y, 1M, 1C, and 1K perform the image forming operation.

In the image processing device, image processing, such as shading correction, misregistration correction, brightness/color space conversion, gamma correction, or various image editing works such as frame erasing or color editing and movement editing, is performed on the input image data. The image data that has undergone the image processing is converted into color material gradation data of 4 colors, Y, M, C, and K, and is output to the laser exposure machine 13.

In the laser exposure machine 13, according to the input color material gradation data, for example, the photoreceptor 11 of each of the image forming units 1Y, 1M, 1C, and 1K is irradiated with the exposure beam Bm emitted from a semiconductor laser. The surface of each of the photoreceptors 11 of the image forming units 1Y, 1M, 1C, and 1K is charged by the charger 12 and then scanned and exposed by the laser exposure machine 13. In this way, an electrostatic latent image is formed. By each of the image forming units 1Y, 1M, 1C, and 1K, the formed electrostatic latent image is developed as a toner image of each of the colors Y, M, C, and K.

In the primary transfer portion 10 where each photoreceptor 11 and the intermediate transfer belt 15 come into contact with each other, the toner images formed on the photoreceptors 11 of the image forming units 1Y, 1M, 1C, and 1K are transferred onto the intermediate transfer belt 15. More specifically, in the primary transfer portion 10, by the primary transfer roll 16, a voltage (primary transfer bias) with a polarity opposite to the polarity of the charging polarity (negative polarity) of the toner is applied to the substrate of the intermediate transfer belt 15, and the toner images are sequentially overlapped on the surface of the intermediate transfer belt 15 and subjected to primary transfer.

After the primary transfer by which the toner images are sequentially transferred to the surface of the intermediate transfer belt 15, the intermediate transfer belt 15 moves, and the toner images are transported to the secondary transfer portion 20. In a case where the toner images are transported to the secondary transfer portion 20, in the transport device, the paper feeding roll 51 rotates in accordance with the timing at which the toner images are transported to the secondary transfer portion 20, and the paper K having the target size is fed from the paper storage portion 50. The paper K fed from the paper feeding roll 51 is transported by the transport roll 52, passes through the transport guide 53, and reaches the secondary transfer portion 20. Before reaching the secondary transfer portion 20, the paper K is temporarily stopped, and a positioning roll (not shown in the drawing) rotates according to the movement timing of the intermediate transfer belt 15 holding the toner images, such that the position of the paper K is aligned with the position of the toner images.

In the secondary transfer portion 20, via the intermediate transfer belt 15, the secondary transfer roll 22 is pressed on the back roll 25. At this time, the paper K transported at the right timing is interposed between the intermediate transfer belt 15 and the secondary transfer roll 22. At this time, in a case where a voltage (secondary transfer bias) with the same polarity as the charging polarity (negative polarity) of the toner is applied from the power supply roll 26, a transfer electric field is formed between the secondary transfer roll 22 and the back roll 25. In the secondary transfer portion 20 pressed by the secondary transfer roll 22 and the back roll 25, the unfixed toner images held on the intermediate transfer belt 15 are electrostatically transferred onto the paper K in a batch.

Thereafter, the paper K to which the toner images are electrostatically transferred is transported in a state of being peeled off from the intermediate transfer belt 15 by the secondary transfer roll 22, and is transported to the transport belt 55 provided on the downstream side of the secondary transfer roll 22 in the paper transport direction. The transport belt 55 transports the paper K to the fixing device 80 according to the optimum transport speed in the fixing device 80. The unfixed toner images on the paper K transported to the fixing device 80 are fixed on the paper K by being subjected to a fixing treatment by heat and pressure by the fixing device 80. Then, the paper K on which a fixed image is formed is transported to an ejected paper-storing portion (not shown in the drawing) provided in an ejection portion of the image forming apparatus.

Meanwhile, after the transfer to the paper K is finished, the residual toner remaining on the intermediate transfer belt 15 is transported to the cleaning portion as the intermediate transfer belt 15 rotates, and is removed from the intermediate transfer belt 15 by the back roll 34 for cleaning and an intermediate transfer belt cleaner 35.

Hitherto, the present exemplary embodiment has been described. However, the present exemplary embodiment is not limited to the above exemplary embodiments, and various modifications, changes, and ameliorations can be added thereto.

EXAMPLES

Hereinafter, the present invention will be more specifically described with reference to examples. However, the present invention is not limited to the following examples.

Example 1

Formation of Substrate Layer

N-methyl-2-pyrrolidone (NMP), carbon nanotube as a filler A (CNT (1): "VGCF-H" from Showa Denko K. K.), and an SiC filler (B11) as a large-diameter filler B (Shinano Electric Refining Co., Ltd.), and an SiC filler (B21) as a small-diameter filler B (manufactured by Shinano Electric Refining Co., Ltd.) are mixed with a polyamic acid ("TX-HMM" from UNITIKA LTD.) and subjected to high-pressure dispersion treatment, thereby obtaining a filler dispersion.

Thereafter, a polyamic acid ("TX-HMM" from UNITIKA LTD.) is mixed with the filler dispersion and stirred with a planetary mixer manufactured by AICOHSHA MFG. CO., LTD., thereby obtaining a polyamic acid solution.

The mixing amount of each component is set such that the amount of each filler is the amount shown in Table 1.

Next, a cylindrical mold is coated with the polyamic acid solution, followed by baking at 380° C., thereby obtaining an endless belt having a film thickness of 100 μm. The obtained endless belt is used as a substrate layer.

Formation of Elastic Layer

The outer peripheral surface of the obtained substrate layer is coated with liquid silicone rubber (manufactured by Shin-Etsu Chemical Co., Ltd., X34-1053), followed by heating at 110° C. for 15 minutes, thereby obtaining an elastic layer having a film thickness of 400 μm.

Formation of Surface Layer

Then, by injection molding, a PFA-containing fluororesin tube having a film thickness of 30 μm is molded. The fluororesin tube is put on the elastic layer and heated at 200° C. for 120 minutes, thereby forming a surface layer consisting of a fluororesin tube.

Through the above steps, a fixing belt is obtained.

Examples 2 to 14 and Comparative Examples 1 to 6

A fixing belt is obtained in the same manner as in Example 1, except that the type and amount of fillers are changed according to Table 1 in forming the substrate layer.

The details of fillers used are as below.

Filler A
- CNT (1): Carbon nanotube ("VGCF-H" from Showa Denko K. K.) Filler B
- SiC filler (B11): "SSC-A15" manufactured by Shinano Electric Refining Co., Ltd.
- $Al_2O_3$ filler (B12): "DAM-05" manufactured by Denka Company Limited.
- $Al_2O_3$ filler (B13): "DAW-20" manufactured by Denka Company Limited.
- $Al_2O_3$ filler (B14): "DAM-10 (carboxy group-modified product)" manufactured by Denka Company Limited.
- $Al_2O_3$ filler (B15): "DAM-20" manufactured by Denka Company Limited.
- SiC filler (B21): "SSC-A01" manufactured by Shinano Electric Refining Co., Ltd.
- AlN filler (B22): "A-01-F" manufactured by MARUWA CO., LTD.
- $Al_2O_3$ filler (B23): "ASFP-20" manufactured by Denka Company Limited.
- $Al_2O_3$ filler (B23): "ASFP-20" (amino group-modified product) manufactured by Denka Company Limited.
- $Al_2O_3$ filler (B25): "DAW-01" manufactured by Denka Company Limited.

Thermal Conductivity of Fixing Belt

A sample is collected from the fixing belt obtained in each example.

Then, the thermal conductivity of the sample is measured under the condition of a load of 50 g by a temperature wave analysis method using ai-phase (manufactured by Ai-Phase Co., Ltd.)

Evaluation of Durability of Fixing Belt

The fixing belt obtained in each example is mounted on a fixing device of an image forming apparatus (manufactured by Fuji Xerox Co., Ltd.: Versant 3100i Press) that has a heat source located on the inside of the fixing belt and employs a fixing method in which heat from the heat source is transferred to a toner image via the fixing belt.

By using the image forming apparatus, a 50% Cin halftone image is continuously printed on A4 paper (P paper manufactured by FUJIFILM Business Innovation Corp.) at an output speed (printing speed) of 100 ppm (100 sheets/min).

Whenever the image has been printed on 100,000 sheets, the fixing belt is taken out and observed to check whether or not the substrate layer cracks or breaks. Then, the durability of the fixing belt is evaluated according to the following standard.

Image Defect
- A (⊚): No crack or breakage occurs in the substrate layer at a point in time when the image has been printed on 300,000 sheets.
- B (o): No crack or breakage occurs in the substrate layer at a point in time when the image has been printed on 200,000 sheets, but the substrate layer is found to have cracks or breakage at a point in time when the image has been printed on 300,000 sheets.
- C (x): The substrate layer is found to have cracks or breakage at a point in time when the image has been printed on 100,000 sheets.

TABLE 1-1

| | Needle-shaped or fibrous filler A | | | | Spherical fillers B | | | | | | | |
|---|---|---|---|---|---|---|---|---|---|---|---|---|
| | | | | | B1 | | | | B2 | | | |
| | Type | Length L1 μm | Diameter μm | Amount % | Type | | Particle size D50v μm | Amount % by volume | Surface functional group | Type | | Particle size D50v μm | Amount % by volume | Surface functional group |
| Example 1 | CNT (1) | 5.04 | 0.139 | 19.20% | SiC filler | (B11) | 15.5 | 4.07% | — | SiC filler | (B21) | 0.91 | 0.98% | — |
| Example 2 | CNT (1) | 4.97 | 0.150 | 20.07% | Al$_2$O$_3$ filler | (B12) | 7.1 | 4.11% | — | AlN filler | (B22) | 1.42 | 1.05% | — |
| Example 3 | CNT (1) | 4.90 | 0.154 | 20.14% | Al$_2$O$_3$ filler | (B13) | 19.4 | 4.00% | — | Al$_2$O$_3$ filler | (B23) | 0.37 | 1.07% | — |
| Example 4 | CNT (1) | 5.01 | 0.145 | 15.10% | Al$_2$O$_3$ filler | (B14) | 10.2 | 3.71% | Carboxy group | SiC filler | (B24) | 0.88 | 0.42% | Amino group |
| Example 5 | CNT (1) | 5.12 | 0.151 | 19.88% | SiC filler | B11) | 16.1 | 3.48% | — | SiC filler | (B21) | 0.9 | 1.54% | — |
| Example 6 | CNT (1) | 5.07 | 0.158 | 20.41% | SiC filler | (B11) | 15.2 | 4.48% | — | SiC filler | (B21) | 0.87 | 0.52% | — |
| Example 7 | CNT (1) | 5.01 | 0.152 | 4.05% | SiC filler | (B11) | 16.0 | 0.82% | — | SiC filler | (B21) | 0.91 | 0.21% | — |
| Example 8 | CNT (1) | 4.89 | 0.146 | 34.85% | SiC filler | (B11) | 14.8 | 8.13% | — | SiC filler | (B21) | 0.86 | 1.94% | — |
| Example 9 | CNT (1) | 5.14 | 0.157 | 20.45% | SiC filler | (B11) | 15.3 | 3.10% | — | SiC filler | (B21) | 0.93 | 0.67% | — |
| Example 10 | CNT (1) | 4.87 | 0.150 | 19.74% | SiC filler | (B11) | 15.5 | 5.37% | — | SiC filler | (B21) | 0.93 | 1.21% | — |
| Example 11 | CNT (1) | 5.17 | 0.160 | 18.31% | SiC filler | (B11) | 15.8 | 4.62% | — | SiC filler | (B21) | 0.91 | 0.47% | — |
| Example 12 | CNT (1) | 5.03 | 0.150 | 20.00% | SiC filler | (B11) | 14.9 | 3.40% | — | SiC filler | (B21) | 0.84 | 1.60% | — |
| Example 13 | CNT (1) | 5.20 | 0.150 | 3.78% | SiC filler | (B11) | 16.3 | 0.70% | — | SiC filler | (B21) | 0.91 | 0.26% | — |
| Example 14 | CNT (1) | 5.08 | 0.150 | 39.86% | SiC filler | (B11) | 15.8 | 10.03% | — | SiC filler | (B21) | 0.97 | 1.20% | — |
| Comparative Example 1 | CNT (1) | 5.10 | 0.145 | 21.55% | SiC filler | (B11) | 15.5 | 5.00% | — | — | | — | — | — |
| Comparative Example 2 | CNT (1) | 5.02 | 0.150 | 18.73% | — | | — | — | — | SiC filler | (B21) | 0.90 | 5.00% | — |
| Comparative Example 3 | CNT (1) | 4.79 | 0.162 | 19.97% | — | | — | — | — | — | | — | — | — |
| Comparative Example 4 | CNT (1) | 4.87 | 0.155 | 40.30% | — | | — | — | — | — | | — | — | — |
| Comparative Example 5 | CNT (1) | 5.14 | 0.153 | 20.07% | Al$_2$O$_3$ filler | (B12) | 6.95 | 4.11% | — | Al$_2$O$_3$ filler | (B25) | 1.92 | 1.05% | — |
| Comparative Example 6 | CNT (1) | 5.14 | 0.153 | 20.12% | Al$_2$O$_3$ filler | (B15) | 22.50 | 4.53% | — | Al$_2$O$_3$ filler | (B23) | 0.37 | 1.23% | — |

TABLE 1-2

| | Spherical fillers B | | | | Filler content | | | Evaluation | |
|---|---|---|---|---|---|---|---|---|---|
| | Volume-based particle size distribution | | | | | Amount of small-diameter side filler B2/amount of large-diameter side filler B2 Volume ratio % | | | |
| | Maximum peak particle size Dmax μm | Minimum peak particle size Dmin μm | Dmax/Dmin | L1/Dmax | Amount of fillers B/amount of filler A % by volume | | Total mixing amount % by volume | Thermal conductivity | Bending durability |
| Example 1 | 15.5 | 0.94 | 16.5 | 0.33 | 26.30% | 24.08% | 24.25% | 2.6 | A(◎) |
| Example 2 | 7.1 | 1.39 | 5.1 | 0.70 | 25.71% | 25.55% | 25.23% | 1.9 | A(◎) |
| Example 3 | 19.4 | 0.41 | 47.3 | 0.25 | 25.17% | 26.75% | 25.21% | 2.1 | A(◎) |
| Example 4 | 10 | 0.86 | 11.6 | 0.50 | 27.35% | 11.32% | 19.23% | 4 | A(◎) |
| Example 5 | 15.3 | 0.92 | 16.6 | 0.33 | 25.25% | 44.25% | 24.90% | 1.8 | A(◎) |
| Example 6 | 15.8 | 0.86 | 18.4 | 0.32 | 24.50% | 11.61% | 25.41% | 1.9 | A(◎) |
| Example 7 | 14.7 | 0.93 | 15.8 | 0.34 | 25.43% | 25.61% | 5.08% | 1.5 | A(◎) |
| Example 8 | 15.2 | 0.91 | 16.7 | 0.32 | 28.90% | 23.86% | 44.92% | 3.2 | A(◎) |
| Example 9 | 16.0 | 0.83 | 19.3 | 0.32 | 18.44% | 21.61% | 24.22% | 1.3 | A(◎) |
| Example 10 | 14.8 | 0.79 | 18.7 | 0.33 | 33.33% | 22.53% | 26.32% | 1.4 | B(○) |
| Example 11 | 14.7 | 0.93 | 15.8 | 0.35 | 27.80% | 10.17% | 23.40% | 1.2 | A(◎) |
| Example 12 | 15.5 | 0.88 | 17.6 | 0.32 | 25.00% | 47.06% | 25.00% | 1.3 | B(○) |
| Example 13 | 15.5 | 0.92 | 16.8 | 0.34 | 25.40% | 37.14% | 4.74% | 1.1 | A(◎) |
| Example 14 | 15.5 | 0.9 | 17.2 | 0.33 | 28.17% | 11.96% | 51.09% | 2.1 | B(○) |
| Comparative Example 1 | 15.6 | — | — | — | — | — | 26.55% | 0.9 | A(◎) |
| Comparative Example 2 | — | 0.90 | — | — | — | — | 23.73% | 0.9 | A(◎) |
| Comparative Example 3 | — | — | — | — | — | — | 19.97% | 0.7 | A(◎) |
| Comparative Example 4 | — | — | — | — | — | — | 40.30% | 2 | C(X) |
| Comparative Example 5 | 7.3 | 1.83 | 4.0 | 0.70 | 25.71% | 25.55% | 25.23% | 0.8 | B(○) |
| Comparative Example 6 | 21.9 | 0.42 | 52.1 | 0.23 | 28.63% | 27.15% | 25.88% | 1.2 | C(X) |

The above results tell that the fixing belts of the present examples are better in the durability of the substrate layer (that is, the endless belt) and have higher thermal conductivity, compared to the fixing belts of comparative examples.

The present exemplary embodiment includes the following aspects.

(((1)))

An endless belt comprising:
a resin;
a filler A having an aspect ratio of 5 or more; and
two or more fillers B having an aspect ratio of less than 5,
wherein a volume-based particle size distribution of the fillers B has two or more peaks among which a peak existing on a largest diameter side has a particle size Dmax that is equal to or more than 5 times or equal to or less than 50 times a particle size Dmin of a peak existing on a smallest diameter side.

(((2)))

The endless belt according to (((1))),
wherein the particle size Dmax of the peak existing on the largest diameter side is equal to or more than 10 times and equal to or less than 20 times the particle size Dmin of the peak existing on the smallest diameter side.

(((3)))

The endless belt according to (((1))) or (((2))),
wherein the particle size Dmax of the peak existing on the largest diameter side is 8 μm or more and 12 μm or less.

(((4)))

The endless belt according to any one of (((1))) to (((3))),
wherein a total content of the filler A and the fillers B is 5% by volume or more and 45% by volume or less with respect to the endless belt.

(((5)))

The endless belt according to any one of (((1))) to (((4))),
wherein a content of the fillers B is 20% by volume or more and 30% by volume or less with respect to the filler A.

(((6)))

The endless belt according to any one of (((1))) to (((5))),
wherein a content of the filler B having the particle size Dmax on the peak existing on the largest diameter side is higher than a content of the filler B having the particle size Dmin on the peak existing on the smallest diameter side.

(((7)))

The endless belt according to (((6))),
wherein a volume ratio of the content of the filler B having the particle size Dmin on the peak existing on the smallest diameter side to the content of the filler B having the particle size Dmax on the peak existing on the largest diameter side (content of filler B having particle size Dmin/content of filler B having particle size Dmax) is 11% or more and 45% or less.

(((8)))

The endless belt according to any one of (((1))) (7)
wherein at least one of the two or more fillers B has a functional group B1 on a surface of the one filler B, and at least another filler B among the two or more fillers B has a functional group B2 reacting with the functional group B1 on a surface of the another filler B.

(((9)))

An endless belt according to any one of (((1))) to (((8))),
wherein a ratio of a length L1 of the filler A having an aspect ratio of 5 or more to the particle size Dmax of the peak existing on the largest diameter side (length L1/particle size Dmax) is 0.3 or more and 0.6 or less.

(((10)))

A fixing belt comprising:
a substrate layer consisting of the endless belt according to any one of (((1))) to (((9)));
an elastic layer provided on the substrate layer; and
a release layer provided on the elastic layer.

(((11)))

A fixing device comprising:
a first rotary member; and
a second rotary member that is arranged in contact with an outer surface of the first rotary member,
wherein at least one of the first rotary member or the second rotary member is the fixing belt according to (((10))), and
a recording medium with a toner image formed on a surface of the recording medium is inserted into a contact portion between the first rotary member and the second rotary member such that the toner image is fixed.

(((12)))

An image forming apparatus comprising:
an image holder;
a charging device that charges a surface of the image holder;
an electrostatic latent image forming device that forms an electrostatic latent image on the charged surface of the image holder;
a developing device that develops the electrostatic latent image formed on the surface of the image holder with a developer containing a toner to form a toner image;
a transfer device that transfers the toner image to a surface of a recording medium; and
the fixing device according to (((11))) that fixes the toner image to the recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An endless belt comprising:
a resin;
a filler A having an aspect ratio of 5 or more; and
two or more fillers B having an aspect ratio of less than 5,
wherein a volume-based particle size distribution of the fillers B has two or more peaks among which a peak existing on a largest diameter side has a particle size Dmax that is equal to or more than 5 times or equal to or less than 50 times a particle size Dmin of a peak existing on a smallest diameter side.

2. The endless belt according to claim 1,
wherein the particle size Dmax of the peak existing on the largest diameter side is equal to or more than 10 times and equal to or less than 20 times the particle size Dmin of the peak existing on the smallest diameter side.

3. A fixing belt comprising:
a substrate layer consisting of the endless belt according to claim 2;
an elastic layer provided on the substrate layer; and
a release layer provided on the elastic layer.

4. The endless belt according to claim 1,
wherein the particle size Dmax of the peak existing on the largest diameter side is 8 μm or more and 12 μm or less.

5. A fixing belt comprising:
a substrate layer consisting of the endless belt according to claim 4;
an elastic layer provided on the substrate layer; and
a release layer provided on the elastic layer.

6. The endless belt according to claim 1,
wherein a total content of the filler A and the fillers B is 5% by volume or more and 45% by volume or less with respect to the endless belt.

7. The endless belt according to claim 6,
wherein a content of the fillers B is 20% by volume or more and 30% by volume or less with respect to the filler A.

8. A fixing belt comprising:
a substrate layer consisting of the endless belt according to claim 7;
an elastic layer provided on the substrate layer; and
a release layer provided on the elastic layer.

9. A fixing belt comprising:
a substrate layer consisting of the endless belt according to claim 6;
an elastic layer provided on the substrate layer; and
a release layer provided on the elastic layer.

10. The endless belt according to claim 1,
wherein a content of the filler B having the particle size Dmax on the peak existing on the largest diameter side is higher than a content of the filler B having the particle size Dmin on the peak existing on the smallest diameter side.

11. The endless belt according to claim 10,
wherein a volume ratio of the content of the filler B having the particle size Dmin on the peak existing on the smallest diameter side to the content of the filler B having the particle size Dmax on the peak existing on the largest diameter side (content of filler B having particle size Dmin/content of filler B having particle size Dmax) is 11% or more and 45% or less.

12. A fixing belt comprising:
a substrate layer consisting of the endless belt according to claim 11;
an elastic layer provided on the substrate layer; and
a release layer provided on the elastic layer.

13. A fixing belt comprising:
a substrate layer consisting of the endless belt according to claim 10;
an elastic layer provided on the substrate layer; and
a release layer provided on the elastic layer.

14. The endless belt according to claim 1,
wherein at least one of the two or more fillers B has a functional group B1 on a surface of the one filler B, and at least another filler B among the two or more fillers B has a functional group B2 reacting with the functional group B1 on a surface of the another filler B.

15. A fixing belt comprising:
a substrate layer consisting of the endless belt according to claim 14;
an elastic layer provided on the substrate layer; and
a release layer provided on the elastic layer.

16. The endless belt according to claim 1,
wherein a ratio of a length L1 of the filler A having an aspect ratio of 5 or more to the particle size Dmax of the peak existing on the largest diameter side (length L1/particle size Dmax) is 0.3 or more and 0.6 or less.

17. A fixing belt comprising:
a substrate layer consisting of the endless belt according to claim 16;
an elastic layer provided on the substrate layer; and
a release layer provided on the elastic layer.

18. A fixing belt comprising:
a substrate layer consisting of the endless belt according to claim 1;
an elastic layer provided on the substrate layer; and
a release layer provided on the elastic layer.

19. A fixing device comprising:
a first rotary member; and
a second rotary member that is arranged in contact with an outer surface of the first rotary member,
wherein at least one of the first rotary member or the second rotary member is the fixing belt according to claim 10, and
a recording medium with a toner image formed on a surface of the recording medium is inserted into a contact portion between the first rotary member and the second rotary member such that the toner image is fixed.

20. An image forming apparatus comprising:
an image holder;
a charging device that charges a surface of the image holder,
an electrostatic latent image forming device that forms an electrostatic latent image on the charged surface of the image holder;
a developing device that develops the electrostatic latent image formed on the surface of the image holder with a developer containing a toner to form a toner image;
a transfer device that transfers the toner image to a surface of a recording medium; and
the fixing device according to claim 19 that fixes the toner image to the recording medium.

\* \* \* \* \*